12,728,041

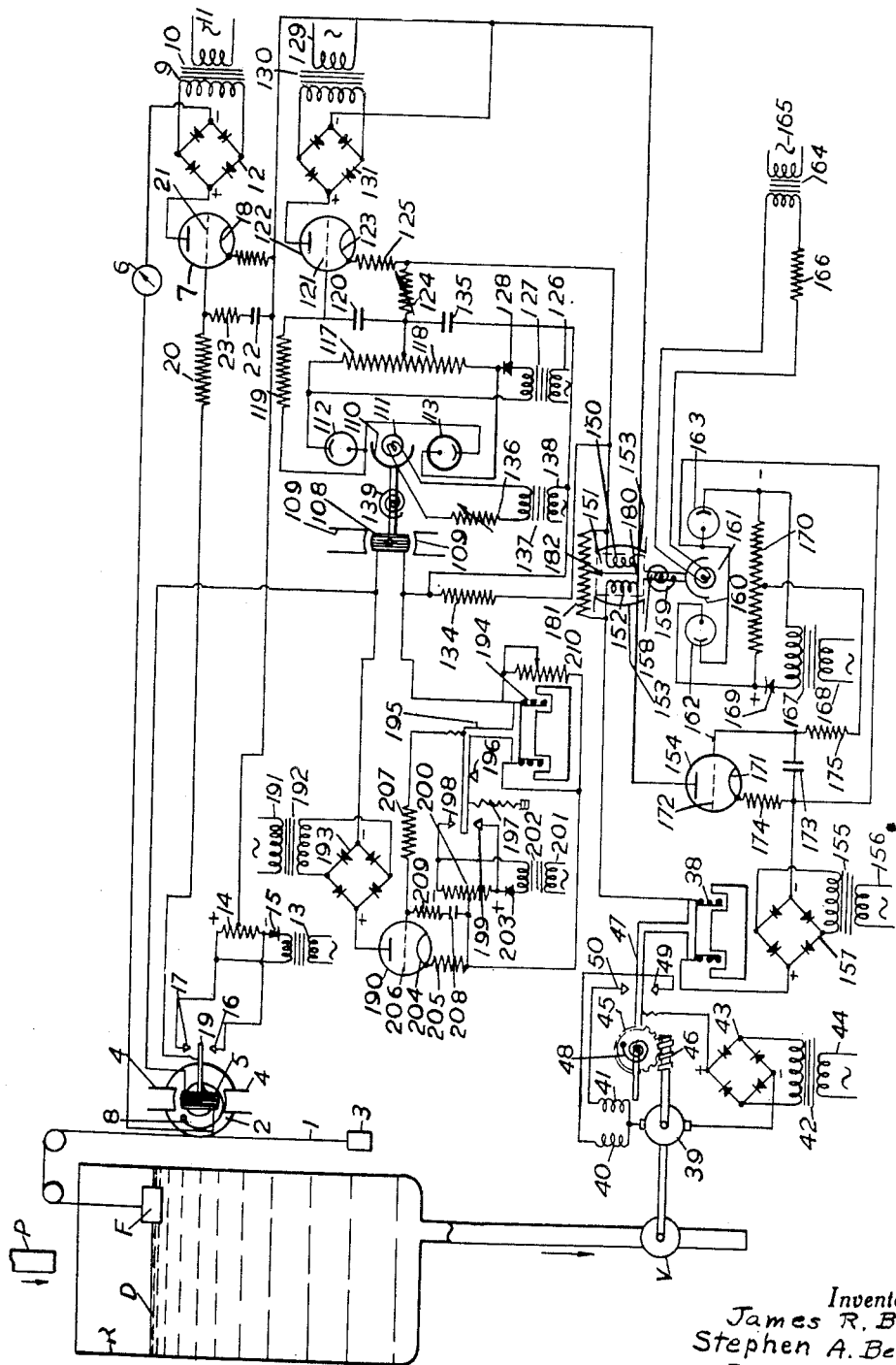

United States Patent Office

Patented Dec. 20, 1955

2,728,041

PROPORTIONAL BAND SETTING DEVICE FOR ELECTRIC MOTOR CONDITION CONTROLLING APPARATUS

James Reilly Boundy and Stephen A. Bergen, Chiswick, London, England, assignors to Evershed & Vignoles Limited, London, England, a British company Application July 3, 1950, Serial No. 171,994

Claims priority, application Great Britain July 6, 1949

9 Claims. (Cl. 318—482)

This invention relates to electrically-actuated apparatus for controlling physical quantities which are subject to variation. In general, therefore, the invention is concerned with controllers for use in maintaining a system in a state of equilibrium, and which are brought into operation by a departure from a datum value of some physical quantity whose value is determined by the state of the system. Such controllers are usually arranged to control the operation of a power receiver which is set to restore the equilibrium of the system. The power receiver is controlled by the output of an electrical transmitter arranged to yield an electric current whose value varies with the magnitude of the variable physical quantity. Such controllers may be used for controlling physical quantities of various kinds as, for example, for maintaining a liquid level, a temperature, a pressure or a degree of humidity in a state of equilibrium and in some kinds of controllers, actually at or close to a datum value. The power receiver may control an element such as a valve for controlling the inflow or outflow of a liquid or of a moist gas or of a pressure medium, but it may also control the setting of other elements such as a controller of electric current for variable heating and so forth.

Some forms of electrical controllers are set forth in the specification of the U. S. Patent No. 2,608,678 in which, in addition to a proportional control factor, an integral control factor and a derivative control factor may all be derived from electrical quantities produced by suitable electric and electromagnetic components. Thus as applied particularly to controllers of liquid level, it was proposed to employ a transmitter for providing an electric current whose magnitude varies with the liquid level to be controlled, to provide an integrating circuit under control of that electric current to yield an additional current to serve as an integral control factor and to provide a differentiating network to yield a derivative control factor and to apply all three of these factors to a power receiver connected to the controlled member in such a way as to restore the controlled level towards a predetermined datum level in a stable manner without hunting and to maintain the level at the said datum level. Provision was made for adjustment of the constants of the proportional control factor, the integral control factor and the derivative factor and also what was termed a throttling range control, now more usually known as a proportional band setting, was provided.

A proportional band setting is an adjustment device for regulating the percentage of the full range of change in the physical quantity which will produce an adjustment of the controlled member over its full range. Thus, if a liquid level controller is set so that a change in liquid level over its full range causes an adjustment of a regulating valve or other controlled member over its full range of movement, the proportional band is said to be 100 per cent and increased sensitivity is equivalent to a relatively smaller proportional band.

The form of proportional band setting described in the said patent application was a variable resistance connected to shunt the operating coil of an electromagnetic device for adjusting the valve or other controlled member. Thus, in order to increase the proportional band setting or, in other words, to render the controller less sensitive, it was necessary to reduce the value of the variable shunting resistance and thus also to reduce the current in the operating coil. If, however, a given change in physical quantity produces a change in the setting of the controlled member, which is not sufficient to enable the controlled member to maintain equilibrium under the changed conditions, it is necessary to increase the sensitivity and decrease the proportional band setting. With a mere variable shunt, however, the only possible result is to reduce the current flowing in the operating coil of the power receiver, and this gives a minimum value of the proportional band setting, corresponding to an open circuit of the shunting resistance. A further increase in sensitivity beyond this value requires an increase of current in the operating coil of the power receiver.

One of the aims of the present invention, therefore is to provide means for adjusting the proportional band setting of an electrical controller of the kind referred to over a range which is not dependent on the current produced by the transmitter, so as to achieve any degree of sensitivity necessary to enable the controlled member to take up a position to maintain a new set of conditions.

Thus, according to the invention, in order to adjust the proportional band setting of such an electrically-actuated controller, the current from the transmitter, or a current proportional to it is caused to flow through one of a pair of coils so coupled and arranged that, when the current in one coil changes, the current in the other changes correspondingly and the current in the second coil is caused to effect directly or indirectly the power receiver; the proportional band setting is then adjusted by appropriate shunting of either one or both the coils. In order to provide a continuously variable adjustment setting, the pair of coils may be shunted by a single resistance having a manually variable tapping point connected to one end of each coil so that, as the tapping point is varied, the shunting of one coil is increased while the shunting of the other coil is decreased and vice versa.

The pair of coils thus constitute a current balance, and in one form of such balance, the two coils are mounted to form the moving element of an electrical measuring instrument so as to move in the air gap of the magnet system of the instrument. The position of the moving element serves to control the current in such a way that for any given position of the moving element the net torque produced by the pair of coils acting in opposition is balanced by the torque produced by a control spring. One method of utilising the position of the moving element of the instrument to control the current in the second coil is to arrange the moving element to carry a shutter arranged to vary the relative amount of illumination incident on each of a pair of photo-electric cells connected in series across a source of direct current potential to form two arms of a Wheatstone bridge. As the position of the moving element is varied, so the degree of out-of-balance of the bridge is correspondingly varied and this out-of-balance voltage is then used to control the current in the second coil. Preferably the out-of-balance voltage is applied to the grid of an electron valve in such a way as to control the anode current, which flows through the second coil.

In addition to the current from the transmitter, the current flowing in the first coil of the pair may have superimposed on it additional current components conforming respectively with the integral with respect to time of the actual deviation of the magnitude of the variable physical quantity from its datum value and also with the rate of change of the magnitude of the variable physical quantity, and these integral and differential components may be produced in any of the ways described in the aforesaid patent application. For example, the integral component may be produced by causing the current from the transmitter to flow through a moving coil serving as the movement of an electrical meter and arranged to actuate a shutter to vary the relative amount of illumination applied to a pair of photo-electric cells connected in series across a source of direct current potential to form two arms of a Wheatstone bridge. The out-of-balance current of this bridge is then used to charge the grid condenser of an electron valve so that the anode current of that valve contains a component which represents the desired integral. The grid condenser of the valve may also have superimposed on it a voltage conforming with the differential of the deviation of the magnitude of the physical quantity, and this voltage may be derived from a differentiating circuit connected across the ends of a resistance through which the current from the transmitter is caused to flow. One method of varying the magnitude of the voltage representing the differential component is to derive it from the ends of a variable resistance connected in series with a condenser across the ends of the resistance through which the transmitter current is flowing.

In order that the invention may be clearly understood and readily carried into effect, an example of one form of electrically-actuated controller in accordance with the invention will now be described with reference to the accompanying diagram of the components and circuit connections of a controller for controlling the level of liquid in a reservoir.

The controller is designed to maintain the level of the liquid, which may be oil, at a constant datum level D in a reservoir R. Liquid flows into the reservoir through an inlet pipe P at a variable rate, and the controller operates to adjust an outlet valve V so as to regulate the rate of outflow in order to maintain the liquid at the desired datum level. Any sudden change in the rate of inflow through the pipe P results in a small change of level in the reservoir R and this serves to change the position of a float F on the surface of the liquid, which is connected by a cord 1 to a pulley 2 which the cord encircles. The cord is weighted at 3 so that if the liquid level rises or falls the pulley 2 is rotated by a corresponding amount.

The pulley 2 is connected through a spiral spring 8 to the moving coil 5 of an electrical meter having permanent magnets 4, and this moving coil is supplied with the anode current of a triode valve 7. The anode current is obtained from the secondary winding 9 of a transformer 10 fed from an alternating current source 11, the current being rectified by a bridge-connected rectifier 12. The current flows in series through an ammeter 6, the moving coil 5 and then through a remote circuit to be described later.

The grid potential of the valve 7 is controlled by a voltage derived from a potential dividing resistance 14 fed from a transformer 13 through a contact rectifier 15. The positive and negative terminals of the resistance 14 are connected respectively to two fixed contacts 17 and 16. The mid-point of the resistance 14, being the point of zero potential, is connected to the cathode 18 of the triode 7. The moving coil 5 bears a contact arm 19 which plays between the contacts 16 and 17 and is connected through a resistance 20 to the control grid 21 of the triode 7. The grid condenser 22 connected in series with a resistance 23 between the grid 21 and the cathode 18 serves to maintain the charge which the grid 21 receives when the contact arm makes contact with either of the contacts 16 or 17.

The characteristics of the triode 7 and the values of the resistance 20 and the condenser 22 are such that the apparatus operates as follows:

If the liquid level in the reservoir R rises, the pulley 2 is rotated in a counter-clockwise direction by a corresponding amount, serving to unwind the spring 8 and cause the contact arm 19 to touch the contact 17, so that the condenser 22 receives a positive charge from the resistance 14 at a rate depending upon the resistance 20. Thus the grid potential is made less negative with respect to the cathode so that the anode current flowing through the coil 5 is increased and the coil 5 is deflected in a direction to oppose the spring 8 and move the arm 19 away from the contact 17. This continues as the spring 8 is unwound but when the pulley 2 comes to rest the arm 19 floats slightly away from the contact 17 and the charging of the condenser 22 is discontinued. However, this charge slowly leaks away until contact is again made between 17 and 19, which again restores a condition of equilibrium in which the arm 19 floats between the two contacts 16 and 17.

Similarly if the liquid level in the reservoir R falls, the pulley 2 is rotated in a clockwise direction and contact is made between the arm 19 and the contact 16, reducing the charge on the condenser 22 and hence also reducing the anode current of the valve 7 until a position of equilibrium is once again reached with the arm 19 floating between the two contacts 16 and 17. In this way, the anode current of the valve 7 is adjusted to a value proportional to the level of the liquid in the reservoir R and thus the valve 7, together with its control arrangement, constitutes an electrical transmitter producing a current proportional to the liquid level.

The anode current of the valve 7, after flowing through the moving coil 5, passes to a remote circuit which includes a coil 150. This coil 150 is wound in opposition to a similar coil 152, on a former or rotor shown by the dotted line 151. This pair of oppositely wound coils constitutes the moving element of an electrical measuring instrument having permanent magnets 153. The coil 152 is connected in the anode circuit of a triode valve 154 connected in series with the coil 38 of a pot magnet constituting the operating coil of the power receiver of the system. The anode current is supplied from a transformer 155 supplied from a source of alternating current 156 and is rectified by a bridge-connected rectifier 157. In addition to the coil 38, the power receiver includes a reversible direct current electric motor 39 having a split field winding 40, 41 supplied through a transformer 42 and a bridge-connected rectifier 43 from a source of alternating current 44. The armature shaft of the motor 39 is mechanically connected to the outlet valve V and also drives a worm wheel 45 through a worm 46. The shaft of the worm wheel 45 also forms the pivot of a lever 47 which tends to be turned in a counter-clockwise direction by means of a spiral spring 48 having its outer end anchored to the worm wheel 45 and its inner end anchored to the lever 47. The lever 47 carries the coil 38 and also forms a contact arm playing between fixed contacts 49 and 50 connected respectively to the outer ends of the motor field windings 40 and 41. Thus rotation of the motor 39 in one direction winds up the spring 48 and increases the torque on the lever 47.

When the system is in a steady state, the spring 48 just balances the pull of the coil 38 so that the lever 47 lies between the contacts 49 and 50 as shown in the drawing. An increase or decrease of the anode current of the triode 154 upsets the balance so that the lever 47 makes contact either with the fixed contact 49 or 50. The positive pole of the rectifier 43 is connected directly to the lever 47 so that when the latter touches the contact 49 or 50 the motor 39 is set into operation in such a direction as to shift the outlet valve V and at the same time to drive the worm wheel 45 so as to restore the balance of the lever 47 and thus de-energise the motor 39.

The movement of the electrical measuring instrument constituted by the pair of moving coils 150 and 152 is mounted for rotation on a spindle 158 under the control of a spiral spring 159. At its end remote from the moving coils, the spindle 158 carries a light shutter in the form of a part-cylindrical shell shown diagrammatically at 160, mounted co-axially with the coils for rotation with them. The shell constitutes slightly more than half a cylinder and in its central position allows light from a stationary lamp 161 mounted in its interior to shine on a pair of photo-electric cells 162 and 163 so as partly to illuminate them. Rotation of the shell in one direction or the other thus decreases the illumination of one cell while increasing that of the other. The lamp 161 is energised from a transformer 164 from a source of alternating current 165 and is controlled by a resistance 166.

The two photo-electric cells are connected in series across a source of direct current potential provided from a transformer 167 energised from an alternating current source 168, and the output of the transformer is rectified by a contact rectifier 169. The cells thus form two arms of a Wheatstone bridge, the other two arms of which are constituted by the two halves of a resistance 170, also connected across the source of direct current potential. The tapping points of the bridge are constituted by the mid-point between the two cells and the mid-point of the resistance 170, and are connected respectively to the cathode 171 of the valve 154 through a cathode resistance 174 and to the control grid 172 through a resistance 175, a small grid condenser 173 being connected between the grid and cathode.

When the shutter 160 is in a central position so that the two cells 162 and 163 are equally illuminated, the bridge is balanced and the grid 172 is maintained at the same potential as the cathode 171 of the valve 154. Under conditions of zero current flow in the coil 150, the spring 159 is arranged to turn the shutter 160 into such a position that the cell 162 is illuminated to a greater extent than the cell 163. In this way the impedance of the cell 162 is reduced so that the mid-point between the two cells is at a higher potential than the mid-point of the resistance 170, and thus the grid 172 is given a negative bias with respect to the cathode 171 sufficient to cut off the anode current of the valve 154.

As soon, however, as current starts to flow in the coil 150 a torque is exerted in opposition to the control spring 159, turning the shutter 160 in such a direction that the bridge is brought more nearly into a state of balance and the negative bias on the grid 172 is reduced to allow current to flow in the anode circuit of the valve and thus through the coil 152. The torque produced by the current in the coil 152 is in opposition to that produced by the current in the coil 150 and, by means of the arrangement just described, the current in the coil 152 is automatically regulated so that the two torques are substantially equal and a state of equilibrium of the moving element is established. Under these conditions, the current in the coil 152 is substantially equal to that in the coil 150 and in the absence of shunts it will be understood that the current in the coil 152, and hence in the operating coil 38 of the power receiver, will be equal to the current in the coil 150, which is the current produced by the transmitter and is proportional to the level of the liquid in the reservoir R.

By shunting the coil 152 so that only a proportion of the current flowing in the operating coil 38 also flows in the coil 152, the current in the operating coil 38 is increased above that derived from the transmitter and the sensitivity of the system is increased. Similarly, by shunting the coil 150, the sensitivity of the system is reduced. In order that the sensitivity of the system may be varied in either direction, and hence the proportional band setting varied over a wide range, the coils 150 and 152 are connected together at one end of each coil at 180. The opposite ends of the two coils are connected together by a resistance 181 provided with a variable tapping 182 connected to the point 180. In this way, the coil 150 is shunted by the righthand half of the resistance 181, whereas the coil 152 is shunted by the lefthand half of the resistance 181. When the tapping point 182 is in the centre of the resistance 181, the two coils are equally shunted. Movement of the tapping point 182 to the left of the central position increases the shunting of the coil 152 and decreases the shunting of the coil 150 to raise the sensitivity of the system and decrease the proportional band setting. In the same way, movement of the tapping point 182 to the right of the central position reduces the sensitivity of the system and increases the proportional band setting.

In addition to the current produced by the transmitter and proportional to the level of the liquid in the reservoir R, a further current having components proportional respectively to the integral with respect to time of the deviation of the liquid level from its datum value and to the rate of change of the liquid level is produced by a triode valve 122 and is caused to flow through the coil 150. In order to control the anode current of this valve 122, the current from the transmitter is caused to flow through a coil 108 constituting the movement of an electric current measuring instrument having permanent magnets 109. The coil 108 controls a light shutter 110 of part-cylindrical form, similar to the shutter 160 already described. In the centre of the shutter is a fixed lamp 111, energised from a transformer 137 from a source of alternating current 138 and controlled by a variable resistance 136.

The moving coil 108 is controlled by a light spiral spring 139 acting in opposition to the torque produced by the current from the transmitter flowing through the coil 108. Thus, as the current from the transmitter increases, so the deflection of the shutter 110 also increases. When the shutter 110 is in its central position, the lamp 111 illuminates equally a pair of photo-electric cells 112 and 113. If the current flowing in the coil 108 increases, the light falling upon the cell 112 is increased while the light falling upon the cell 114 is decreased and vice versa.

The two photo-electric cells 112 and 113 are connected in series to form two arms of a current bridge, the remaining arms of which consist of resistances 117 and 118 of equal value. The bridge is energised from a source of direct current potential provided from a source of alternating current 126 through a transformer 127 and a rectifier 128. The tapping points of the bridge are constituted by the mid-point between the two cells 112 and 113 and the mid-point between the resistances 117 and 118. The first of these is connected through a fixed resistance 119 to one terminal of a grid condenser 120 and also to the control grid 121 of the triode 122, while the second of these, the mid-point between the resistance 117 and 118, is connected to the opposite terminal of the grid condenser 120 and to the cathode 123 of the triode 112 through a variable resistance 124 and a cathode biassing resistance 125.

In this way the out-of-balance current of the bridge is applied to the condenser 120, which is accordingly charged at a rate dependent on this out-of-balance current. The out-of-balance current depends on the variation of the liquid level from its datum value and hence at any instant the rate of charge of the condenser is proportional to this variation from the datum value. Therefore at any instant the total charge stored in the condenser represents the integral with respect to time of this variation from the datum value. Since the voltage to which this condenser is charged is applied between the grid and the cathode of the triode 122, the anode current of this valve is given a component which is dependent on this integral. Since the magnitude of the out-of-balance current at any time depends on the brightness of the lamp 111, the magnitude of the integral component may be controlled by adjustment of the resistance 136.

In order to introduce into the anode current of the triode 122 a further component dependent upon the rate of change of the liquid level with respect to time, a differentiating network is included between the circuit through which the transmitter current flows and the control grid of the triode 122. This network comprises a resistance 134 connected in series with the moving coil 108 in the circuit from the electrical transmitter, so that a current proportional to the liquid level flows in this resistance and a voltage proportional to the level is generated between its ends. Between the ends of this resistance, therefore, is connected a condenser 135 in series with the resistance 124. Thus, while a steady current is flowing through the resistance 134, the condenser 135 reaches a steady state of charge and no current flows through the resistance 124. As soon, however, as the current through the resistance 134 varies, the voltage applied to the condenser 135 is varied correspondingly and a charging or discharge current will start to flow, and will generate across the resistance 124 a voltage proportional to the rate of change of the current in the resistance 134 and hence proportional to the rate of change of the liquid level.

As will be seen, the voltage generated across the resistance 124 is applied between the cathode 123 and the control grid 121 of the triode 122 in addition to that applied by the storage condenser 120. Thus the potential of the grid 121 is further modified in accordance with the rate of change of the liquid level and a corresponding component is introduced into the anode current of the valve 122. Variation of the magnitude of this component is simply achieved by adjustment of the resistance 124 which adjusts the voltage generated across it.

As an alternative to adjusting the resistance 124, the resistance 134 may be varied so as to vary the magnitude of the differential component. This has the disadvantage, however, that any variation of the voltage across this resistance will lead to a charge or discharge of the condenser 135, thus temporarily introducing a derivative component even if the controller is operating under steady conditions. The anode current of the valve 122 is derived from a source of alternating current 129 through a transformer 130 and a bridge-connected rectifier 131. This anode current, containing the integral and differential components already mentioned, then flows through the coil 150 and is superimposed on the proportional current derived from the transmitter. The current in the coil 152, therefore, also has these components superimposed on it and the outlet valve V is therefore controlled accordingly, with all the well-known advantages of this type of control.

In order to ensure that the bridge circuit comprising the photo-electric cells 112 and 113 is balanced when the liquid level is at its datum value, it is necessary to adjust the zero position of the moving coil 108. This might be achieved by a corresponding adjustment of the control spring 139 but this is often inconvenient, and as shown, zero adjustment is obtained by passing a steady biasing current through the moving coil 108. This biasing current is derived from a triode valve 190 whose anode circuit is supplied from a source of alternating current 191 through a transformer 192 and a bridge-connected rectifier 193. The anode circuit also includes the coil 194 of a pot magnet shunted by a variable resistance 210 and this coil is carried by an arm 195 mounted to turn about a pivot 196. The pull of the coil 194 is opposed by a tension spring 197 so that in the condition of balance the end of the arm 195 floats between a pair of fixed contacts 198 and 199. These are connected respectively between the negative and positive ends of a potential dividing resistance 200 supplied with direct current from an alternating current source 201 through a transformer 202 and a contact rectifier 203.

The mid-point of the resistance 200, which is the point of zero potential, is connected to the cathode 204 of the valve 190 through a cathode resistance 205, while the arm 195 is connected to the control grid 206 through a resistance 207, a grid condenser 208 in series with a resistance 209 also being provided. When the anode current of the valve 190 is at its steady value to produce the necessary biassing effect on the moving coil 108, the lever 195 is in its balanced condition so that its free end floats between the contacts 198 and 199. If, however, the anode current drops slightly, the pull of the spring 197 overcomes the pull of the coil 194 so that the arm 195 touches the contact 199. This applies a positive potential to the arm 195 and hence to the grid 206, which is maintained by the condenser 208, and tends to increase the anode current until a balanced condition is reestablished. Similarly, if the anode current becomes too great, the arm 195 touches the contact 198, tending to reduce the grid potential and hence also the anode current. In this way, the anode current is maintained at a substantially steady value to produce the desired biasing effect on the moving coil 108.

If the magnitude of this anode current requires to be varied, this is simply achieved by corresponding variation of the shunting resistance 210. This automatically varies the proportion of the total current which flows through the coil 194 and since this current is maintained constant, the total current is varied correspondingly.

Although the power receiver illustrated comprises an electric motor 39 controlled by the coil 38 and serving to regulate the outlet valve V, it is to be understood that any equivalent form of power receiver may be used. For example, a pneumatically-operated power-receiver such as that described in connection with Figure 3 of the drawings of U. S. Patent No. 2,608,678 may be substituted. In the same way, alternative forms of transmitter may be employed, provided only that they give a current proportional to the liquid level or other physical quantity which is to be maintained at the datum level.

We claim:

1. In an electrically actuated controller for controlling the magnitude of a physical quantity subject to variation from a datum value, the combination of means of producing an electric current whose value varies with the magnitude of the variable physical quantity, a first coil supplied with an electric current dependent on said variable current, adjustable shunting means for said first coil, a second coil, second adjustable shunting means for said second coil, a circuit including a source of electric current for supplying current to said second coil and to said second shunting means in parallel relation, means for controlling the current in said circuit to maintain a predetermined relation between the currents in said coils, and means responsive to the total current in said second coil and in said second shunting means for controlling the magnitude of said variable quantity.

2. An electrically actuated controller as claimed in claim 1, in which said first and second shunting means together comprise a resistance connected between one end of said first coil and one end of said second coil and a manually adjustable tapping contact with said resistance, said tapping contact being connected to the other ends of said coils.

3. In an electrically actuated controller for controlling the magnitude of a physical quantity subject to variation from a datum value, the combination of means for producing an electric current whose value varies with the magnitude of the variable physical quantity, a first coil, means for supplying said coil with an electric current dependent on said variable current, means mounting said coil to turn in a magnetic field, an adjustable shunting means for said first coil, a second coil, means mounting said second coil to turn in a magnetic field, means mechanically coupling said second coil to said first coil, second adjustable shunting means for said second coil, a circuit including a source of electric current for supplying current to said second coil and to said second shunting means in parallel relation, means for controlling the current in said circuit and thereby the current in said second coil to balance the torque produced by the current in said first coil, and means responsive to the total current in said second coil and in said second shunting means for controlling said variable quantity.

4. In an electrically actuated controller for controlling the magnitude of a physical quantity subject to variation from a datum value, the combination of means for producing an electric current whose value varies with the magnitude of the variable physical quantity, a permanent magnet field system, a rotor mounted to turn in the field of said field system, a first coil wound on said rotor, means for supplying said coil with an electric current dependent on said variable current, adjustable shunting means for said first coil, a second similar coil also wound on said rotor, second adjustable shunting means for said second coil, a circuit including a source of electric current for supplying current to said second coil and to said second shunting means in parallel relation, means responsive to the angular position of said rotor for controlling the current in said circuit and thereby the current in said second coil to balance the torque produced by the current in said first coil, and means responsive to the total current in said second coil and in said second shunting means for controlling the magnitude of said variable quantity.

5. In an electrically actuated controller for controlling the magnitude of a physical quantity subject to variation from a datum value, the combination of means for producing an electric current whose value varies with the magnitude of the variable physical quantity, a permanent magnet field system, a rotor mounted to turn in the field of said field system, a first coil wound on said rotor, means for supplying said coil with an electric current dependent on said variable current, adjustable shunting means for said first coil, a second similar coil also wound on said rotor, second adjustable shunting means for said second coil, a source of electric current supplying said second coil, a bridge circuit comprising a source of direct current potential and a pair of photo-electric cells connected in series with said source of potential, means responsive to the angular position of said rotor for controlling the differential illumination of said photo-electric cells, means responsive to the degree of unbalance of said bridge circuit for controlling the current in said second coil, and means responsive to the total current in said second coil and in said second shunting means for controlling the magnitude of said variable quantity.

6. In an electrically actuated controller for controlling the magnitude of a physical quantity subject to variation from a datum value, the combination of means for producing an electric current whose value varies with the magnitude of the variable physical quantity, a permanent magnet field system, a rotor mounted to turn in the field of said field system, a first coil wound on said rotor, means supplying said coil with an electric current dependent on said variable current, adjustable shunting means for said first coil, a second similar coil also wound on said rotor, second adjustable shunting means for said second coil, a source of electric current supplying said second coil, a bridge circuit comprising a source of direct current potential and a pair of photo-electric cells connected in series with said source of potential, a source of illumination, means responsive to the angular position of said rotor for controlling the proportion of illumination from said source falling on each of said photo-electric cells, a thermionic tube having a control grid, an anode circuit for said tube having said second coil connected in series therewith, means for applying the unbalance voltage of said bridge circuit to the control grid of said tube for controlling the current in said second coil, and means responsive to the total current in said second coil and in said second shunting means for controlling the magnitude of said variable quantity.

7. An electrically actuated controller as claimed in claim 6, in which said means for controlling the proportion of illumination from said source falling on each of said photoelectric cells comprises a shutter carried by said rotor.

8. A controller according to claim 4 and including spring means for applying a biasing force to said rotor in a direction tending to reduce the current in said second coil.

9. In an electrically actuated controller for controlling the magnitude of a physical quantity subject to variation from a datum value, the combination of means for producing an electric current whose value varies with the magnitude of the variable physical quantity, a control device including a movable element, a pair of actuating coils arranged for moving said element in opposite directions, means energizing one of said coils by said electric current, a circuit for supplying current to the other coil of said pair, means controlled by movement of said element for varying the magnitude of said physical quantity, means controlled by the movement of said element to vary the current in said other coil in accordance with current variations in said one coil, a shunting path connected across each of said coils, and manually adjustable means for simultaneously varying the resistance of said shunting paths in opposite directions.

References Cited in the file of this patent

UNITED STATES PATENTS

| | | |
|---|---|---|
| 2,085,589 | Johnston | June 29, 1937 |
| 2,282,726 | Jones | May 12, 1942 |
| 2,312,711 | Harrison | Mar. 2, 1943 |
| 2,336,994 | MacKay | Dec. 14, 1943 |
| 2,410,651 | Glass | Nov. 5, 1946 |
| 2,463,681 | De Giers et al. | Mar. 8, 1949 |
| 2,545,412 | Perret-Bit | Mar. 13, 1951 |